Feb. 2, 1965 S. O. RAYMOND 3,168,024
PHOTOGRAPHIC APPARATUS

Filed Nov. 21, 1961 4 Sheets-Sheet 1

INVENTOR.
SAMUEL O. RAYMOND
BY
ATTORNEY

Feb. 2, 1965 S. O. RAYMOND 3,168,024
PHOTOGRAPHIC APPARATUS
Filed Nov. 21, 1961 4 Sheets-Sheet 2

INVENTOR.
SAMUEL O. RAYMOND
BY Ralph L. Cadwallader
ATTORNEY

INVENTOR.
SAMUEL O. RAYMOND
BY Ralph L. Cadwallader
ATTORNEY

United States Patent Office 3,168,024
Patented Feb. 2, 1965

3,168,024
PHOTOGRAPHIC APPARATUS
Samuel O. Raymond, Watertown, Mass.
(Main St., North Falmouth, Mass.)
Filed Nov. 21, 1961, Ser. No. 153,837
11 Claims. (Cl. 95—11)

This invention relates to photographic apparatus associated with cameras that produce finished pictures by one-step photographic processes. More particularly, it relates to apparatus for advancing the composite sheet material comprising the negative paper and the developed print paper, for separating the same, and for storing said papers in separate rolls.

A number of ways are well known in the art for enclosing cameras in waterproof, transparent housings having exterior control means for operating such cameras underwater. However, insofar as I know, no such housing has been made that will permit the operator to take a series of pictures during one underwater dive with a camera utilizing a one-step photographic process, such as the Land process, prior to my invention. The reason for this is that the operator must, after a picture is taken, pull through the exposed film and the print paper to the developing chamber, crush the capsule containing the reagent that develops the special-type film emulsion and produces a positive picture on the print paper, and remove the print after development.

It is a relatively simple matter to provide mechanisms to perform the various functions required to operate a camera underwater. Providing means to pull through the exposed film and print paper and to remove the developed print has proved to be an exceedingly difficult problem to solve. Highly complex and expensive mechanical systems, or electro-mechanical systems have been suggested. However, such systems are not always reliable, particularly in an underwater environment. Further, means, such as spring-loaded pins, provided in such cameras are adapted to stop further withdrawal of the print paper so a picture may be transferred to the print paper at the proper point. Complex systems like the above must sense this and immediately release tension on the print paper to avoid tearing it, since it is relatively weak insofar as applied tension is concerned.

Contrary to the heretofore suggested complex gear train, mechanical, and electro-mechanical systems, I have devised a unique, simple, and inexpensive mechanical system to advance the sheet material through such a camera, to separate the print paper from the negative paper, and to store each in separate rolls within a watertight housing containing the camera. It is therefore a major object of my invention to provide a simple, inexpensive mechanical system to perform the above functions.

Another object of my invention is to provide a mechanical system that will permit an operator located underwater to see the picture he has taken while underwater.

Another object of the invention is to provide means that will facilitate easy removal of the rolls of negative and print paper.

A further object of the invention is to provide a mechanical system in which substantially constant tension is maintained on the print paper, thereby eliminating breakage thereof.

Yet another object of the invention is to provide a mechanical system that will advance the composite sheet material with a single, fairly rapid motion without having a human operator touch the film.

These and further objects of the invention will in part be obvious and will in part appear hereinafter.

The invention accordingly comprises the apparatus possessing the construction, combination of elements and arrangement of parts which are exemplified in the apparatus hereinafter described, and the scope of the application of which will be indicated in the claims.

In the drawings, wherein like reference characters refer to like parts throughout the several views.

In summary, my invention utilizes two slotted takeup spindles into which the print and negative papers are threaded. Each spindle has a pulley mounted on one end thereof. A belt connects the pulleys. A capstan is connected to the negative paper spindle exteriorly of the watertight housing. A lanyard is used to transmit a fairly rapid rotary motion to the negative paper spindle and a similar rotary motion to the print paper spindle. The belt is sufficiently loose for it to slip on the print paper spindle pulley. This ensures the application of substantially constant tension on the print paper.

It will facilitate understanding my invention to first consider, as an example, the Land one-step photographic process. In this process, the exposed film and the paper for the print are passed onto a single paper leader in the camera. The paper on which the finished picture is printed is not light-sensitive; but attached to it are small capsules (one for each picture) of jellied reagent which develops with the special-type film emulsion and causes transfer of a positive picture to the paper. The process may be completed one minute after the camera shutter is clicked. The finished print is then removed from the back of the camera and the film, crushed capsules, and masks are discarded.

Hereinafter, I will use the term "composite sheet material" to mean the combination of the paper on which the finished picture is printed, the crushed capsules, any remaining reagent and chemicals, the masks, and the exposed film. The term "print paper" shall mean the paper on which the finished picture is printed. The term "negative paper" shall mean the crushed capsules, any remaining reagent and chemicals, and the exposed film paper.

Figure 1:
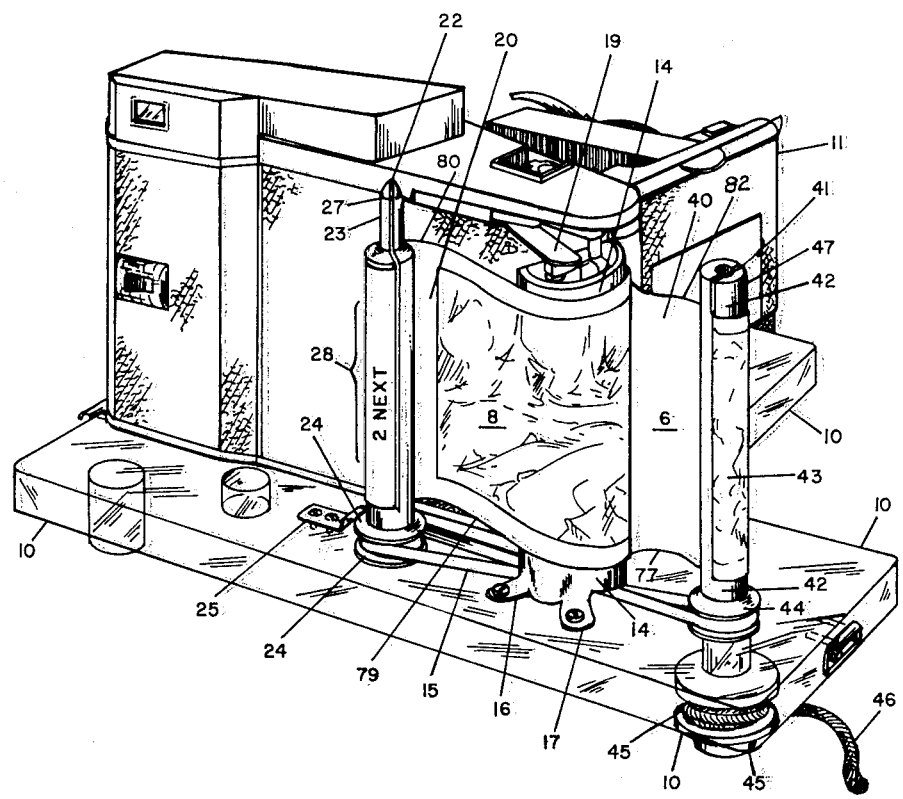
FIGURE 1 is a perspective view of the invention with part of the watertight housing removed showing the print and negative papers threaded into their respective spindles.
Figure 2:
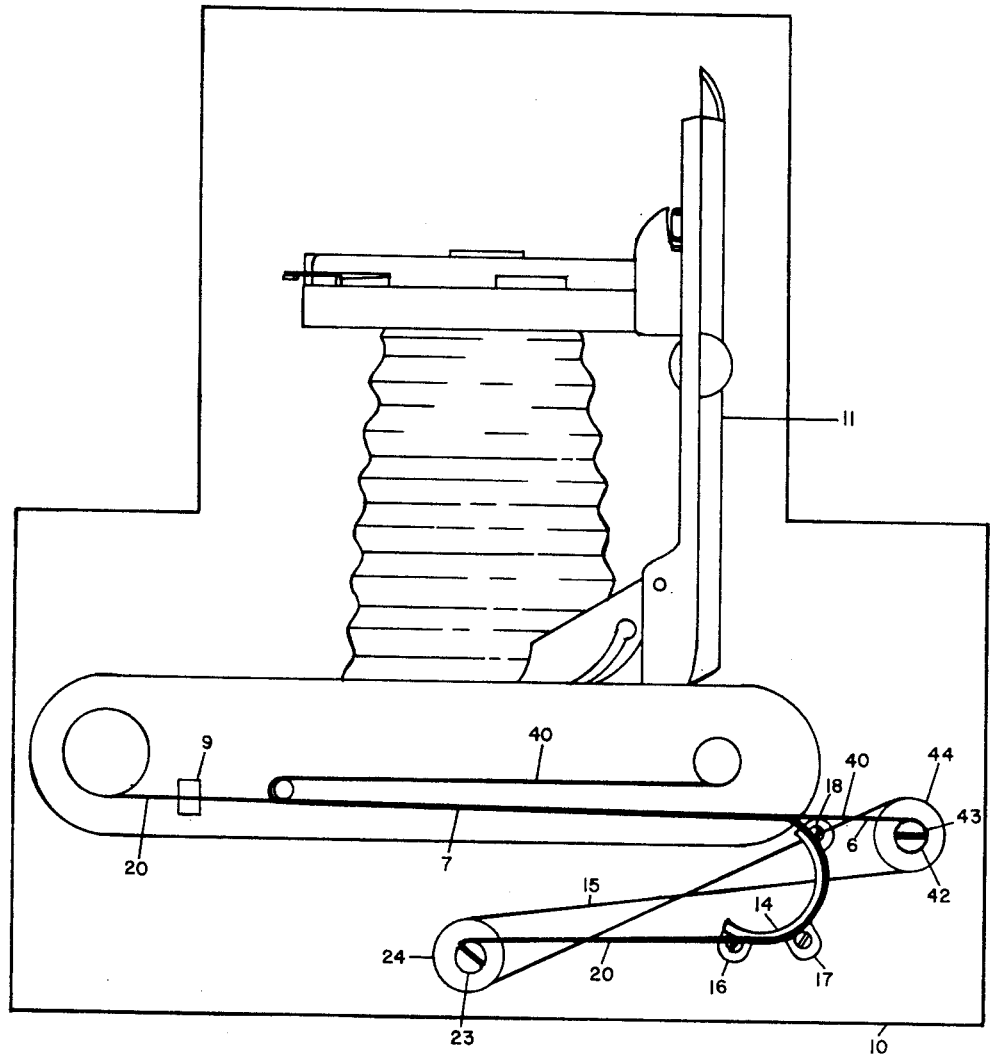
FIGURE 2 is a schematic illustration of the location of the print and negative papers of FIGURE 1.

The invention will best be understood by referring to FIGURES 1 and 2 in which base 10 (of a waterproof, transparent container which may be made of acrylic) is shown having a camera 11 seated thereon. Cover 12 of the container is not shown to better illustrate the invention. The composite sheet material 7 has been withdrawn from camera 11 and separated into print paper 20 and negative paper 40.

Print paper 20 is passed around guide 14 and threaded into slot 22 of print paper spindle 23. Negative paper 40 is threaded into slot 41 of negative paper spindle 42 in such a manner that the wet inner surface 6 of negative paper 40 is rolled up on the inside; that is, the outer surface of negative roll 43 is always dry.

Note in FIGURE 2 that pin 9 is illustrated as restraining further advancement of print paper 20. The friction between print paper 20 and negative paper 40 in the development chamber is sufficient for pins 9 to restrain both, or to restrain composite sheet material 7. Pins 9 may be made inoperative to restrain advancement of composite sheet material 7 by appropriate controls mounted exteriorly on cover 12. Such controls are not shown herein because they form no part of my invention.

Mounted adjacent to base 10 and axially on negative paper spindle 42 is pulley 44. Mounted exteriorly of base 10 and axially on negative paper spindle 42 is capstan 45. Attached to capstan 45 is lanyard 46.

Mounted adjacent to base 10 and axially on print paper spindle 23 is pulley 24. Mounted on base 10 adjacent to pulley 24 is clamp 25 which prevents print paper spindle 23 from falling out of bearing 26 (see FIGURE 3) when cover 12 has been removed.

Belt 15 interconnects pulleys 24 and 44 and passes under guide 14. Guide 14 stands on feet 16, 17 and 18 (not shown) which are fastened to base 10 by any convenient means and is displaced sufficiently therefrom to clear belt 15. In FIGURE 1 belt 15 is illustrated as crossed. This is done for a reason later to be explained.

Means are provided within cover 12 that fit around ends 27 and 47 of print paper spindle 23 and negative paper spindle 42, respectively, as will later appear.

In operation, pins 9 are first rendered inoperative to restrain advancement of sheet material 7. Then lanyard 46 is wound on capstan 45 in such manner that when given a firm fairly rapid pull, negative paper spindle 42 is caused to rotate in a clockwise direction as viewed when looking down toward base 10. The length of lanyard 46 is selected so that a single, fairly rapid motion is imparted to composite sheet material 7 by negative paper spindle 42. As negative paper 40 is withdrawn from camera 11 it is rolled up on negative paper spindle 42.

With crossed belt 15 interconnecting pulleys 44 and 24, print paper spindle 23 is caused to rotate in a counter-clockwise direction. Print paper 20 is withdrawn from camera 11 and rolled up on print paper spindle 23.

With print paper threaded into slot 22 and advanced as illustrated, picture 8 and printing 28 on the backside of print paper 20, will be visible to the operator located underwater. On some commercially available print papers this printing may tell what negative is ready to be exposed in camera 11. Thus, if the printing reads "2 Next," as illustrated, the operator using my invention will know that negative number 2 is being developed in the back of camera 11 and negative number 3 is ready to be exposed in the front of the camera.

Since print paper 20 is dry on both sides the print paper roll is easily removed from print paper spindle 23 by sliding it vertically upward.

It will be apparent that belt 15 need not be crossed; that is, print paper 20 may be threaded in slot 22 so that a clockwise rotary motion of print paper spindle 23 will roll up print paper 20.

It is, however, important that belt 15 be sufficiently loose on pulley 24 to slip thereon so as to maintain constant tension on print paper 20, and yet tight enough to cause print paper spindle 23 to perform its functions.

Figure 3:
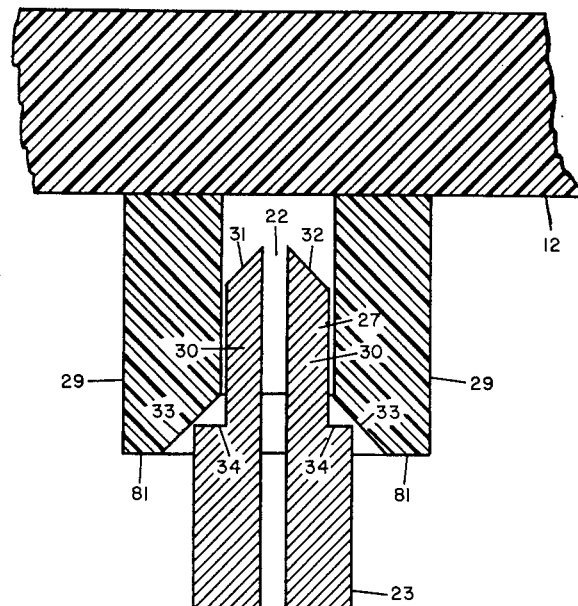
FIGURE 3 is a sectional view, in part, of the print paper spindle and associated bearing surfaces.

The mounting details of print paper spindle 23 are illustrated in FIGURE 3. Print paper spindle 23 may be made of nickel plated brass, or stainless steel. It has slot 22 extending from end 27 toward pulley 24 such a distance that the bottom 78 of slot 22 is at the same height as the bottom edge 79 of print paper 20. The top edge 80 of print paper 20 just clears the bottom surface 81 of bearing 29. This prevents buckling of print paper 20 when it is withdrawn from camera 11. Bearing 29 is a short cylindrical tube of acrylic having an inner diameter such as to loosely fit around end journal 30 of print paper spindle 23. The tips 31 and 32 of end 27 of print paper spindle 23 and the inner surface 33 of bearing 29 are tapered at 45°. These tapered surfaces serve to guide bearing 29 quickly and easily down on spindle 23 when cover 12 is installed. Note that shoulder 34 does not contact surface 33 for the reason that other protuberances on camera 11 prevent cover 12 from moving downward any further.

Pulley 24 is mounted on print paper spindle 23 by silver soldering or other well known means. It is located adjacent base 10 but is kept out of contact therewith to avoid unnecessary friction.

Bearing 26 in base 10 is of sufficient diameter to fit loosely around end journal 35. Pivot 36 and surface 37 are tapered at different angles so that tip 38 of pivot 36 will seat into tip 39 of bearing 26. Note that bearing 26 does not extend through base 10. This avoids providing a waterproof seal between bearing 26 and end journal 35.

Clamp 25 may be made of nickel plated brass, or stainless steel. It may be mounted by screws 21 as illustrated, or by any other suitable means.

Figure 4:
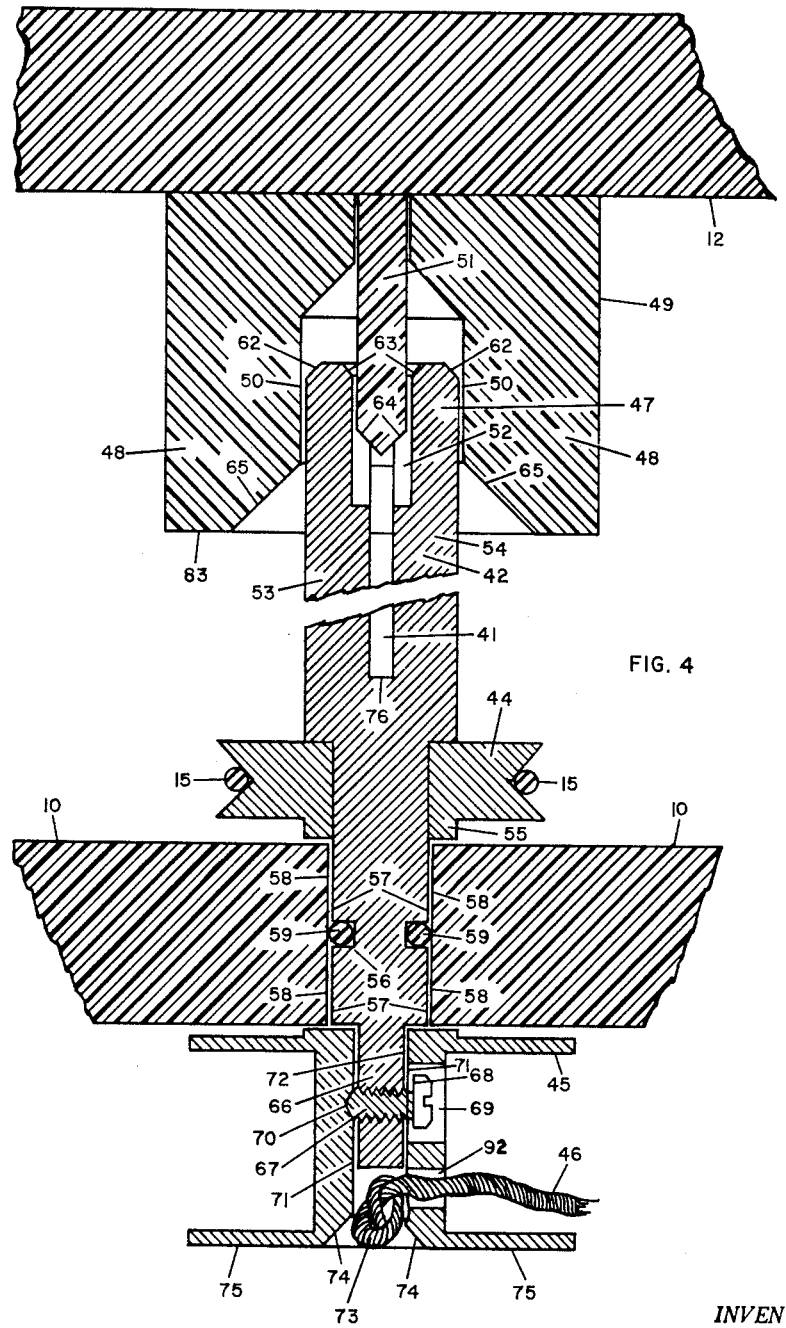
FIGURE 4 is a sectional view in part of the negative paper spindle and associated bearing surfaces.

The mounting details of negative paper spindle 42 are illustrated in FIGURE 4. Negative paper spindle 42 may be made of nickel plated brass, or stainless steel, as desired. It has slot 41 extending from end 47 toward pulley 44 such a distance that the bottom 76 of slot 41 is at the same height as the bottom edge 77 of negative paper 40. The top edge 82 of negative paper 40 just clears the bottom surface 83 of bearing 48. This prevents buckling of negative paper 40 when it is withdrawn from camera 11.

Bearing 48 is made of acrylic. It may be cemented to cover 12 with acrylic solvent. Its outside surface 49 is cylindrical in shape. The diameter of its bearing surface 50 is such as to provide a loose fit around end 47 of spindle 42 when pivot 51 is inserted into cylindrical cavity 52 of spindle 42. Pivot 51 is mounted into bearing 48 by a press fit. Its function is to hold fingers 53 and 54 open when negative paper 40 is rolled up on spindle 42. Otherwise, wet inner surface 6 of negative paper 40 under the action of the rotary motion imparted to spindle 42 would clamp fingers 53 and 54 tightly together. It would then be extremely difficult to remove negative paper roll 43. With this arrangement, pivot 51 is removed from cavity 52 when cover 12 is removed. Fingers 53 and 54 may then be pressed together and negative paper roll 43 easily removed, by sliding it vertically upward.

Surfaces 62, 63, 64 and 65 are all tapered at 45° as illustrated. These tapered surfaces serve to guide bearing 48 quickly and easily down over negative paper spindle 42, and pivot 51 quickly and easily into cavity 52, when cover 12 is installed.

Pulley 44 is mounted on negative paper spindle 42 in the same manner that pulley 24 is mounted on print paper spindle 23. It has a relatively thin shoulder 55 in contact with base 10. The outside diameter of pulley 44 is slightly greater than the outside diameter of pulley 24 to assure that constant tension is maintained on print paper 20.

Negative paper spindle 42 passes through base 10 and is fastened to capstan 45 in a manner later to be explained. It has a rectangular groove 56 cut into journal 57. Journal 57 is in loose contact with bearing surface 58 of base 10. Neoprene rubber O-ring 59 fits into groove 56 and provides a watertight seal between base 10 and journal 57 of negative paper spindle 42.

Capstan 45 may be mounted on center pin 66 of spindle 42 by any suitable means. In FIGURE 4 one means is illustrated wherein center pin 66 is drilled and tapped to receive machine screw 67. A hole 69 is provided in capstan 45 through which machine screw 67 passes. Note that point 70 of machine screw 67 presses against the inner surface 71 of capstan 45 thereby forcing surface 72 of center pin 66 into tight metal-to-metal contact with inner surface 71. Under surface 68 of machine screw 67 does not contact capstan 45.

Another hole 92 is provided in capstan 45 through which lanyard 46 passes and is secured by knot 73 to capstan 45. Surface 74 is tapered to provide a cavity for knot 73 so that surface 75 may sit flat against any other flat surface.

As an example, in one embodiment my invention is used with the model 850 or model 900 cameras and type 47 film presently manufactured and sold by Polaroid Corporation of Cambridge, Massachusetts. In this embodiment spindles 23 and 42 are ½ inch in diameter. Pulley 24 has an outside diameter of 15/16 inch while pulley 44 has an outside diameter of one inch. Slots 22 and 41 are each 3/16 inch wide. The outer diameter of capstan 45 is 1¼ inch and its inner diameter is ½ inch. Lanyard 46 is approximately 14 inches long. Belt 15 is a neoprene rubber O-ring. When shaped as a circle and not under tension neoprene rubber belt 15 has a 3⅛ inch inner diameter. It is stretched approximately 10% and mounted on pulleys 24 and 44. Guide 14 in this embodiment not only guides print paper 20 but holds cutter bar 19 (see FIGURE 1) of said cameras out of the way of print paper 20 and negative paper 40.

It will be apparent to those skilled in the art that the mechanical system of my invention is not only simple but inexpensive.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. Apparatus for advancing, separating and storing the negative paper and the print paper that comprise a single composite sheet material disposed within a photographic device utilizing a one-step photographic process and having means for restraining advancement of said sheet material, which means has been rendered inoperative, said apparatus comprising:
   (a) supporting means;
   (b) first means, mounted on said supporting means, for advancing said sheet material and for receiving and holding said negative paper;
   (c) a capstan mounted axially on said first means;
   (d) a lanyard mounted on said capstan, which may be wound around said capstan and given a quick pull thereby imparting a single fairly rapid rotational motion to said first means to cause said first means to advance said sheet material and to receive and hold said negative paper;
   (e) second means, displaced from said first means and mounted on said supporting means, for separating said print paper from said sheet material and for receiving and holding said print paper; and
   (f) third means interconnecting said first and second means and adapted to cooperate with said capstan and lanyard for, when the latter pair is operated, causing said second means to separate said print paper from said sheet material and to receive and hold said print paper.

2. Apparatus as in claim 1 in which said third means is also adapted to maintain substantially constant tension on said print paper.

3. Apparatus as in claim 1 in which said first means comprises a spindle having a slot into which said negative paper may be passed and folded over, such that the dry back side thereof is on the outside when said negative paper is rolled up on said spindle in response to said rotational motion imparted thereto.

4. Apparatus as in claim 3 in which said supporting means is adapted to hold the slots of said spindle open against the compressive force exerted by the wet inside surface of said negative paper.

5. Apparatus as in claim 1 in which said third means comprises a belt mounted between pulleys mounted axially on said first and second means.

6. Apparatus as in claim 5 in which said belt is crossed.

7. Apparatus as in claim 5 in which said belt is adapted to slip while conveying rotational motion from the pulley mounted on said first means to the pulley mounted on said second means so as to maintain substantially constant tension on said print paper.

8. Apparatus as claimed in claim 1 in which said first means is a spool having two members normally held separated from each other, but susceptible of collapsing to facilitate the removal of the negative paper.

9. Apparatus for advancing, separating and storing the negative paper and the print paper that comprise a single composite sheet material disposed within a photographic device utilizing a one-step photographic process, said apparatus comprising:
   (a) supporting means;
   (b) first means, mounted on said supporting means, for advancing said sheet material and for receiving and holding said negative paper;
   (c) a capstan mounted axially on said first means;
   (d) a lanyard for use with said capstan to produce rotational motion in said first means to advance said sheet material;
   (e) second means, displaced from said first means and mounted on said supporting means, for separating said print paper from said sheet material and for receiving and holding said print paper; and
   (f) third means interconnecting said first and second means to produce rotational motion in said second means in response to rotational motion in said first means.

10. Apparatus for underwater photography comprising:
   (a) a water-tight case;
   (b) a camera of the type that uses a one-step photographic film, disposed within said case;
   (c) means for actuating the controls of said camera from the outside of said case, to expose said film;
   (d) a first take-up spool for advancing the film and receiving and holding the negative paper portion thereof, said spool being mounted inside said case and extending therethrough;
   (e) a capstan mounted axially on said spool outside said case;
   (f) a lanyard for use with said capstan to produce rotational motion in said spool;
   (g) a second take-up spool displaced from said first spool and mounted within said case for separating the print paper from the negative paper, and for receiving and holding the print paper; and
   (h) cooperating means interconnecting the first and second spools to produce rotational motion in the second spool in response to rotational motion in the first spool.

11. Apparatus as claimed in claim 10 in which at least a portion of said case is transparent, and in which the print paper leading to said second spool passes in the vicinity of the transparent portion of the case.

References Cited in the file of this patent

UNITED STATES PATENTS

| | | |
|---|---|---|
| 2,778,269 | Bartlett | Jan. 22, 1957 |
| 2,797,625 | Fairbanks | July 2, 1957 |
| 2,804,811 | Fairbanks | Sept. 3, 1957 |
| 2,880,657 | Bartlett | Apr. 7, 1959 |
| 2,901,143 | Pope | Aug. 25, 1959 |
| 2,930,302 | Tuttle | Mar. 29, 1960 |
| 2,966,103 | Erikson | Dec. 27, 1960 |